(12) United States Patent
Kemmerer et al.

(10) Patent No.: US 10,354,635 B2
(45) Date of Patent: Jul. 16, 2019

(54) ADAPTIVE NULLFORMING FOR SELECTIVE AUDIO PICK-UP

(71) Applicant: BOSE CORPORATION, Framingham, MA (US)

(72) Inventors: Jeremy Kemmerer, Holliston, MA (US); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/800,909

(22) Filed: Nov. 1, 2017

(65) Prior Publication Data

US 2019/0130885 A1    May 2, 2019

(51) Int. Cl.
| | |
|---|---|
| *G10L 21/0216* | (2013.01) |
| *G10K 11/16* | (2006.01) |
| *H04R 3/00* | (2006.01) |
| *G10L 21/0208* | (2013.01) |
| *G10L 15/22* | (2006.01) |

(52) U.S. Cl.
CPC .............. *G10K 11/16* (2013.01); *H04R 3/005* (2013.01); *G10K 2210/3028* (2013.01); *G10L 15/22* (2013.01); *G10L 21/0208* (2013.01); *G10L 2021/02082* (2013.01); *G10L 2021/02165* (2013.01); *G10L 2021/02166* (2013.01)

(58) Field of Classification Search
CPC ....... G10L 21/0208; G10L 2021/02165; G10L 21/0232; G10L 21/057; G10L 15/20; G10L 15/22; H04R 1/406; H04R 3/005

USPC ................ 381/92, 94.1–94.6, 94.7
See application file for complete search history.

(56) References Cited

U.S. PATENT DOCUMENTS

| | | | | |
|---|---|---|---|---|
| 8,175,261 | B2* | 5/2012 | Gough | H04B 3/23 379/406.08 |
| 9,792,927 | B2* | 10/2017 | Fan | G10L 25/84 |
| 2010/0246851 | A1* | 9/2010 | Buck | G10L 21/0208 381/94.1 |
| 2012/0197638 | A1 | 8/2012 | Li et al. | |
| 2013/0170680 | A1* | 7/2013 | Gran | H04R 25/405 381/313 |
| 2014/0278394 | A1* | 9/2014 | Bastyr | G10L 21/0208 704/233 |
| 2014/0301558 | A1* | 10/2014 | Fan | G10L 21/0208 381/71.2 |

(Continued)

FOREIGN PATENT DOCUMENTS

EP       2608197 A1    6/2013

OTHER PUBLICATIONS

Yoganathan, V. et al., "Multi-microphone Adaptive Neural Switched Griffiths-Jim Beamformer for Noise Reduction", ICSP 2010 Proceedings, pp. 299-302.

(Continued)

*Primary Examiner* — Disler Paul
(74) *Attorney, Agent, or Firm* — Bose Corporation

(57) ABSTRACT

Audio pickup systems and methods are provided to enhance an audio signal by removing noise components related to an acoustic environment. The systems and methods receive a primary signal and a reference signal. The reference signal is adaptively filtered and subtracted from the primary signal to minimize an energy content of a resulting output signal.

20 Claims, 8 Drawing Sheets

(56) References Cited

U.S. PATENT DOCUMENTS

2018/0033428 A1* 2/2018 Kim ..................... G10L 15/08

OTHER PUBLICATIONS

"Optimizing Siri on HomePod in Far-Field Settings", vol. 1, Issue 12, by Audio Software Engineering and Siri Speech Team, Apple, Dec. 2018, retrieved from https://machinelearning.apple.com/2018/12/03/optimizing-siri-on-homepod-in-far-field-settings.html on Jan. 23, 2019.
Invitation to Pay Additional Fees dated Jan. 8, 2019 for PCT Appln. No. PCT/US2018/058391.

* cited by examiner

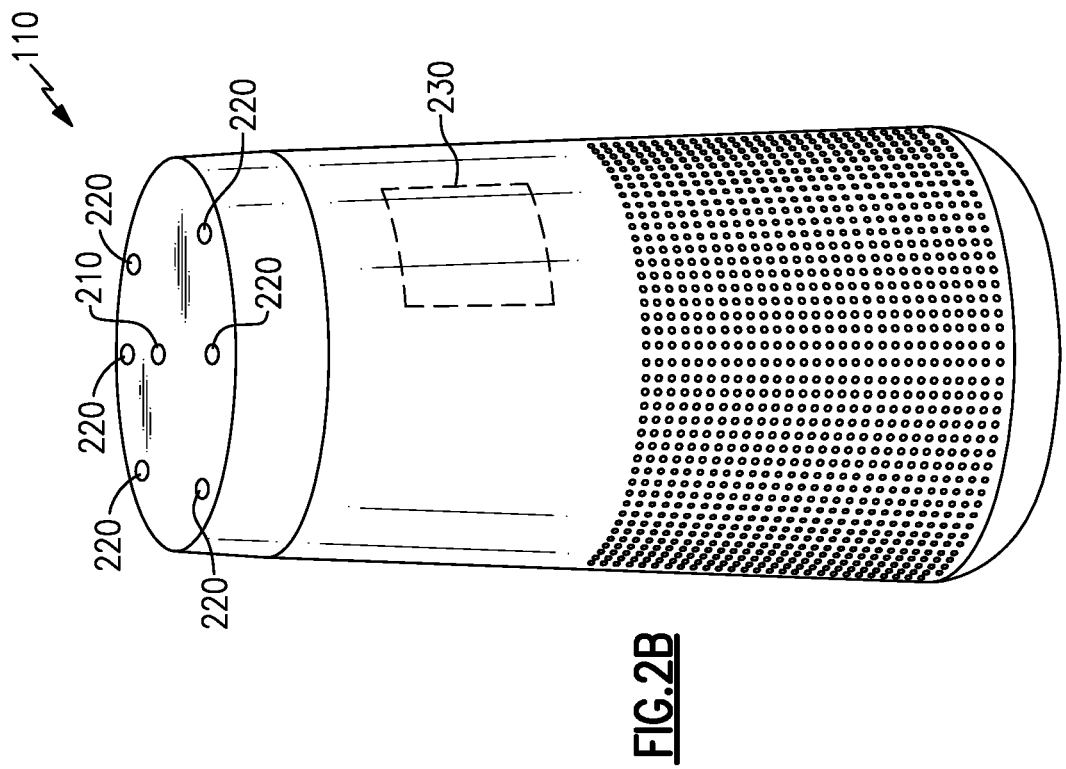
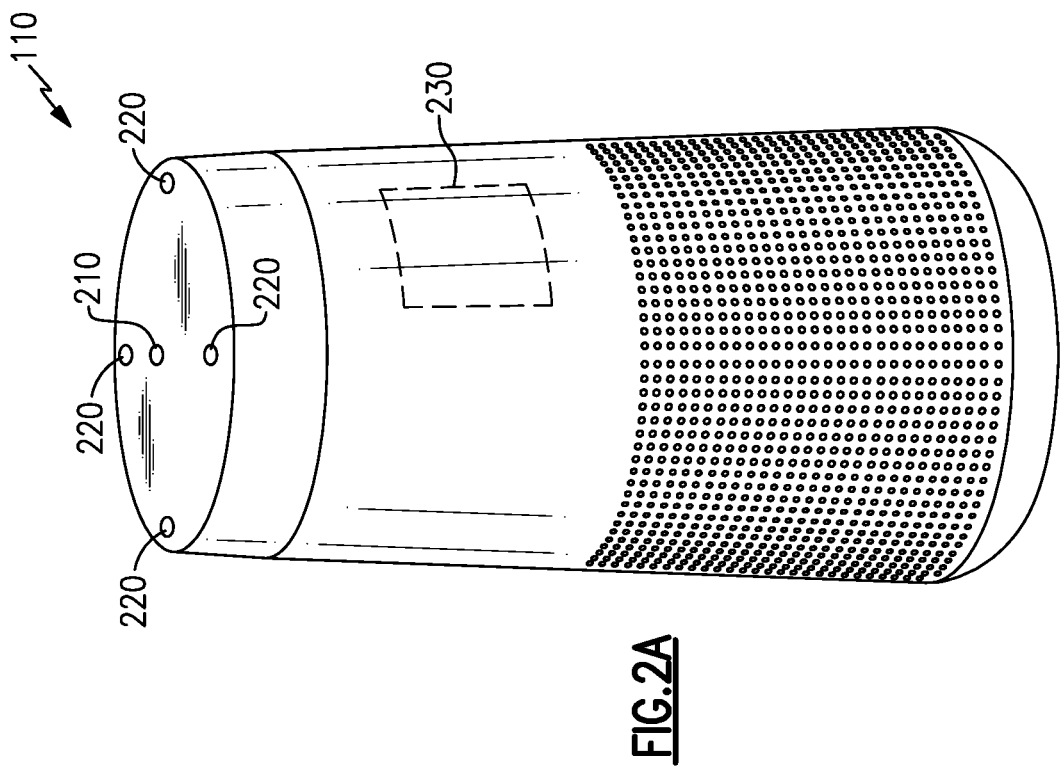

ADAPTIVE NULLFORMING FOR SELECTIVE AUDIO PICK-UP

BACKGROUND

Audio systems sometimes include one or more acoustic transducers to convert acoustic signals into electrical signals (e.g., microphones) to detect acoustics in the environment in which they operate, and sometimes also include acoustic drivers (e.g., loudspeakers) to reproduce acoustic audio content from an electrical signal. Microphones may be deployed in such systems for the purpose of detecting desired audio, which may include a user's speech for applications such as automatic speech recognition, virtual personal assistants, and communications (e.g., telephone), for example. Often, the environment in which the audio system is used includes additional acoustic sources other than the desired audio, such as televisions, other audio systems, noise from equipment, etc., and these alternate acoustic sources may sometimes interfere with the detection and/or processing of the desired audio, e.g., the user's speech. The acoustic environment in which the audio system operates may generally be unknown, and may change significantly over time. Accordingly, alternate or undesired acoustic signals may be unknown at the outset and may also change significantly over time.

SUMMARY

Aspects and examples are directed to systems and methods to pick-up desired audio signals, such as speech activity of a user, and reduce other signal components, such as alternate acoustic sources and/or background noise, to enhance the desired signal components in an output signal. The systems and methods provide enhanced isolation of the desired signal by removing or reducing other signal sources. Various applications include automated speech recognition for, e.g., virtual personal assistants (VPA), and the like. Aspects and examples disclosed herein allow an audio system to pick-up and enhance a desired signal, such as a user's voice, so the user may use such applications with improved performance and/or in noisy environments.

According to one aspect, a method of enhancing an audio signal is provided and includes receiving a primary signal, receiving a plurality of reference signals, each of the plurality of reference signals from one of a plurality of reference microphones, filtering each of the plurality of reference signals to provide a plurality of filtered signals, combining the plurality of filtered signals to provide a noise estimate signal, subtracting the noise estimate signal from the primary signal to provide an output signal, and adapting the filtering of each of the plurality of reference signals to minimize an energy content of the output signal.

Certain examples include monitoring the output signal for a desired signal, and stopping adapting the filtering of each of the plurality of reference signals upon detecting the desired signal. Monitoring the output signal for a desired signal may include monitoring the output signal for a wake-up word.

Some examples include providing the primary signal from a primary microphone. Some examples include combining a plurality of signals from a plurality of microphones to provide the primary signal.

In certain examples, each of the primary signal and the plurality of reference signals may be separated into sub-bands.

Some examples include operating a background adaptive filter upon each of the plurality of reference signals, and wherein adapting the filtering of each of the plurality of reference signals includes copying a set of filter weights from the background adaptive filter.

According to another aspect, an audio system is provided that includes a primary input to receive a primary signal, a plurality of reference inputs, each of the plurality of reference inputs to receive a reference signal, a plurality of adaptive filters, each of the plurality of adaptive filters configured to adaptively filter one of the plurality of reference signals to provide a filtered signal, and one or more combiners configured to receive the plurality of filtered signals and subtract the plurality of filtered signals from the primary signal to provide an output signal.

Certain examples include a detector configured to detect a desired signal component in the output signal and to pause adaptation of the plurality of adaptive filters in response to detecting the desired signal. In some examples, the detector is a wake-up word detector.

Some examples include a plurality of microphones, at least one of the plurality of microphones configured to provide at least one of the reference signals to at least one of the plurality of reference inputs. Certain examples also include a beamformer configured to receive signals from one or more of the plurality of microphones and to provide the primary signal to the primary input.

In some examples, the plurality of adaptive filters are configured to adapt to minimize an energy content of the output signal.

In certain examples, each of the plurality of adaptive filters includes an active filter and a respective background adaptive filter, each active filter being configured to adapt by copying filter weights from the respective background adaptive filter.

According to another aspect, an audio system is provided and includes a primary microphone to provide a primary signal, a reference microphone to provide a reference signal, a filter configured to receive the reference signal and provide a filtered signal, the filter configured to apply a fixed filter response for an interval and to update the fixed filter response upon the expiration of the interval, a combiner to subtract the filtered signal from the primary signal to provide an output signal.

In some examples, the interval is a fixed duration of time.

Certain examples include a background adaptive filter operating on the reference signal and the interval being based upon a convergence time of the background adaptive filter, the expiration of the interval being a time when the background adaptive filter achieves convergence, and the update to the fixed filter response being based upon a filter response of the background adaptive filter at the expiration of the interval.

In certain examples detector is included and configured to detect a desired signal in the output signal, and the interval being based upon the detection of the desired signal.

Some examples include a second reference microphone to provide a second reference signal, and a second filter configured to receive the second reference signal and provide a second filtered signal, the second filter configured to apply a second fixed filter response for the interval and to update the second fixed filter response upon the expiration of the interval, the combiner configured to subtract the filtered signal and the second filtered signal from the primary signal to provide the output signal.

Certain examples may include a beamformer configured to receive one or more microphone signals, including microphone signal from the primary microphone, and to provide the primary signal as a combination of the one or more microphone signals.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like numeral. For purposes of clarity, not every component may be labeled in every figure. In the figures:

FIGS. 2A-2B are perspective views of various examples of an audio system;

DETAILED DESCRIPTION

Figure 1A:
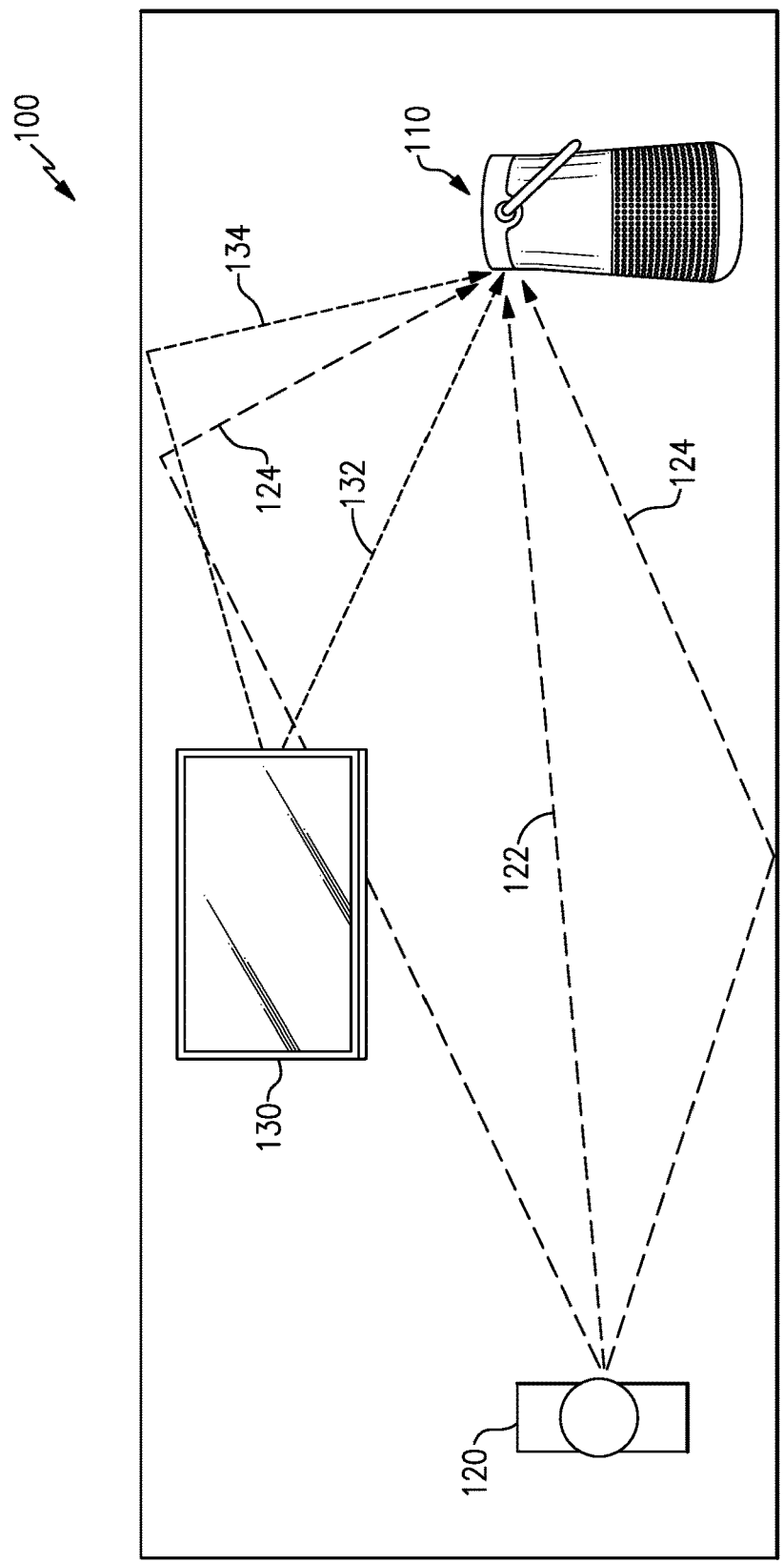
FIGS. 1A-1C are schematic diagrams of an example environment in which an example audio system may operate.

Aspects of the present disclosure are directed to audio systems and methods that pick-up a desired signal, such as a voice signal of a user, while reducing or removing other signal components not associated with the desired signal, e.g., the user's speech. Providing a user's voice signal with reduced noise components may enhance voice-based features or functions available as part of an audio system or other associated equipment, such as communications systems (cellular, radio, aviation), entertainment systems (gaming), speech recognition applications (speech-to-text, virtual personal assistants), and other systems and applications that process audio, especially speech or voice. Examples disclosed herein may be coupled to, or placed in connection with, other systems, through wired or wireless means, or may be independent of other systems or equipment.

The example audio systems and methods described herein may include multiple microphones that provide one or more signals to one or more adaptive filters to produce a substantially null response to a particular acoustic environment. Operation of the adaptive filters (and supportive signal processing) may cause the audio system or method to adapt to the acoustic environment, on an on-going basis, to substantially nullify the background acoustics. In various examples, a substantially null response may include providing an output signal with a minimized energy content. A change in the acoustic environment, such as a user starting to speak or the new presence of a desired signal, to which the adaptive filters have not yet converged to nullify, may provide components of the desired signal in an output signal.

Conventional methods that adapt to an acoustic environment to provide desired signals require certain characteristics of the desired signal, such as a certain source location or arriving phase relationship, and/or require a blocking matrix to effectively enhance or cancel signals from certain directions prior to adaptation, at the expense of increased processing power, resources, and/or energy consumption.

Production of a signal wherein a user's voice components are enhanced while other components are reduced may be referred to generally herein as voice pick-up, voice isolation, speech enhancement, and the like. As used herein, the terms "voice," "speech," "talk," and variations thereof are used interchangeably and without regard for whether such speech involves use of the vocal folds.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, right and left, top and bottom, upper and lower, and vertical and horizontal are intended for convenience of description, not to limit the present systems and methods or their components to any one positional or spatial orientation.

FIG. 1A illustrates an example environment 100 where an example audio system 110 may be in use. The environment 100 may include the audio system 110, a user 120 whose speech is to be detected and provided for further processing, and one or more additional acoustic source(s) 130, such as a television, a radio, a fan, etc. When the user 120 speaks, he or she may produce a direct acoustic signal 122 and/or one or more indirect acoustic signals 124, which may reach the audio system 110. An output signal representative of the user's speech (e.g., representative of the direct acoustic signal 122) is desired to be provided by the audio system 110 for further processing, and may be in an electrical (digital or analog) form, for example. The additional acoustic source(s) 130 also may produce one or more direct acoustic signals 132 and/or indirect acoustic signals 134 that reach the audio system 110. These acoustic signals from the additional acoustic source(s) 130 are prefereably reduced or removed from being represented in the output signal to be provided for processing. Accordingly, an output signal provided by the audio system 110 may include a robust signal-to-noise ratio (SNR), e.g., each of the acoustic signals that are not the user's voice being considered "noise" signals, for example.

Figure 1B:
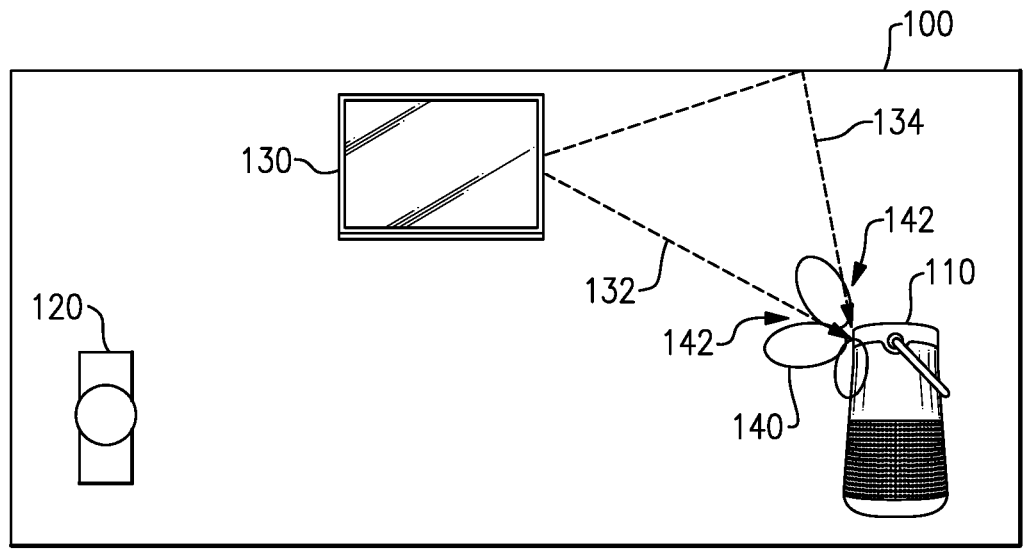

Various examples described herein may apply adaptive filters to one or more microphone signals to produce a substantially null response to the acoustic environment (e.g., to acoustic signals in the environment). For example, FIG. 1B illustrates the example audio system 110 operating in the environment 100 while the user 120 is not speaking. A primary microphone associated with the audio system 110 may pick up acoustic signals, such as the acoustic signals 132, 134, arriving at the audio system 110, and provide a microphone signal that includes components from many or all of the acoustic sources in the environment. Additional microphones (secondary or reference microphones) associated with the audio system 110 may also pick up the same or similar acoustic signals, e.g., forming an array of microphones providing individual microphone signals having variations in arrival times, phase, and amplitude, with respect to each other and the primary microphone. Adaptive filters are applied in various examples to the reference microphone signals and used to modify the primary microphone signal to create a substantially null response, as described in more detail below. Accordingly, a spatial response pattern 140 of the audio system 110 may form null responses 142 for acoustic signals arriving from the directions of, e.g., the acoustic signals 132, 134. While the spatial response pattern 140 may be shown as forming beams and nulls, such is merely for illustrative purposes and various examples described herein will not necessarily form beams of enhanced response and will not necessarily form nulls in a strict sense. Various examples may reduce an acoustic response for acoustic signals coming from certain directions, e.g., based upon the direction(s) to alternate acoustic sources and adaptation as described herein, thus reducing representative content from such acoustic sources in an output signal. Such reduced content and/or reduced response may generally be referred to herein as nullforming.

Figure 1C:
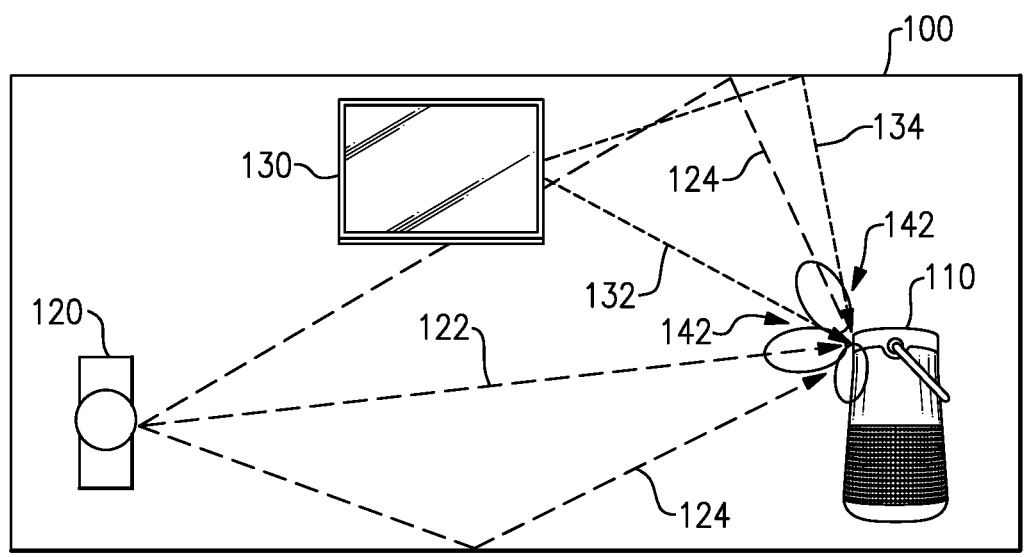

A change in the acoustic environment, such as a new acoustic source or the user starting to speak, as illustrated in FIG. 1C, may produce new acoustic signals, such as the acoustic signals 122, 124, for which the audio system 110 has not formed null responses 142. Accordingly, an output signal from the audio system 110 may include components of the new acoustic signal, e.g., the user's speech. In some examples, the adaptive filters operating on the reference microphone signals may take some time to adapt to the new acoustic signal (e.g., the speech of the user 120) and the time for adaptation may be sufficient to detect that the user is speaking and/or to detect what the user says (e.g., via speech recognition).

In some examples, a time for adaptation by the adaptive filters may be long enough for a command or instruction spoken by the user 120 to be provided in an output signal, prior to the adaptive filters forming a new null that may reduce or cancel the user's speech. In some examples, a wake-up word spoken by the user 120 may be sufficiently short to be detected and trigger a freezing of adaptation by the adaptive filters. In some examples, multiple adaptive algorithms may operate in parallel upon each reference microphone signal such that an adaptive filter operates with frozen (or fixed) response (e.g., temporarily static filter weights/coefficients) for at least some duration of time. In some examples, adaptive filters acting upon reference microphone signals may operate with a delay in updating their filter response (e.g., a delay in updating a set of filter weights/coefficients), such that new acoustic signals (such as the user 120 starting to speak) provide components to the output signal during the time of the delay. Accordingly, in various examples, an output signal provided may include components of a user's speech that may be suitable for further processing by, e.g., speech recognition, virtual personal assistant, and other systems.

Each of FIGS. 2A and 2B illustrates an example audio system 110 having a primary microphone 210, a plurality of reference (or secondary) microphones 220, and a controller 230 that includes signal processing components/circuitry. In various examples, and as shown, the primary microphone 210 may be a central microphone. In other examples, a primary microphone may be any of the microphones shown or another microphone. In yet other examples there may be no particular primary microphone but there may be a primary signal derived or formed from the signals from multiple microphones, e.g., such as in a beam-forming arrangement or other array processing. The example audio systems 110 are shown having a particular form factor, but any of various form factors may be accommodated. Additionally, while FIG. 2A shows an example audio system 110 having four reference microphones and FIG. 2B shows an example audio system 110 having six reference microphones, any number of reference microphones, more or fewer than shown, may be suitable and may be included in various examples. Placement and/or arrangement of the various microphones 210, 220 may also be different. Various examples of the systems and methods described are insensitive to particular microphone placement. Further, some examples may include additional primary microphones and/ or other microphones for various purposes.

While microphones are illustrated in the various figures and labeled with reference numerals, such as reference numerals 210, 220, the visual element(s) illustrated in the figures may, in some examples, represent an acoustic port wherein acoustic signals enter to ultimately reach a microphone 210, 220, which may be internal and not physically visible from the exterior. In examples, one or more of the microphones 210, 220 may be immediately adjacent to the interior of an acoustic port, or may be removed from an acoustic port by a distance, and may include an acoustic waveguide between an acoustic port and an associated microphone.

In some examples, the primary microphone 210 provides a primary signal. In some examples, a primary signal may be provided by combining signals from the microphones 210, 220, e.g., with array processing, to maximize an acoustic response in a direction from which the user is presumed to be speaking. In various examples, adaptive filters operate upon a plurality of reference signals (e.g., provided by the reference microphones 220) to produce a nullifying signal which is used to modify the primary signal to produce an output signal with a substantially null response, e.g., when the user is not speaking. Accordingly, when the user begins to speak the nullifying signal may fail to create a substantially null response (e.g., at least for some period of time) and the output signal may include components related to the user's speech.

Figure 3:
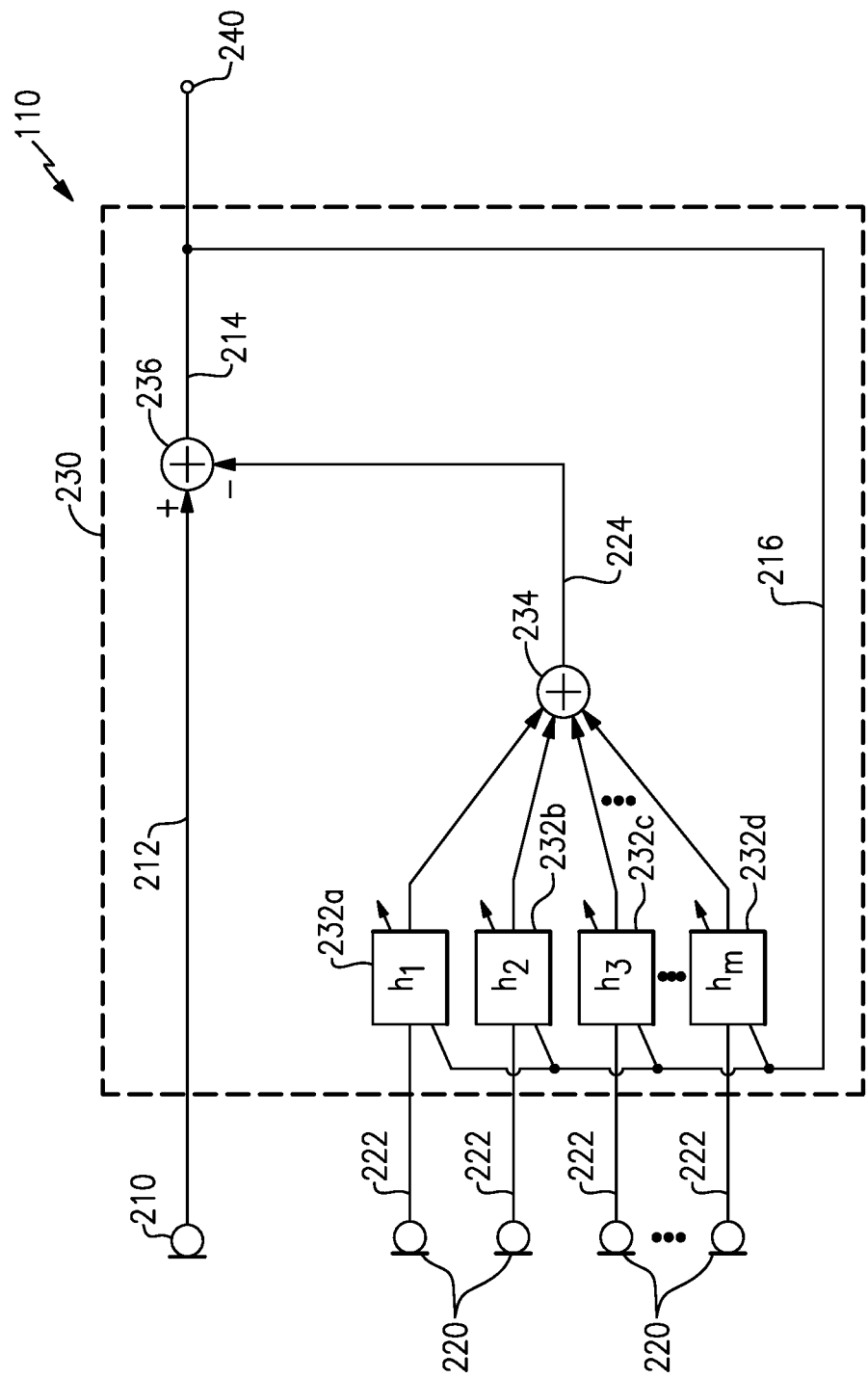
FIG. 3 is a schematic block diagram of an example audio system.

FIG. 3 illustrates at least one example of the audio system 110 that includes the primary microphone 210, reference microphones 220, and at least a portion of the controller 230 that includes signal processing components/circuitry. The primary microphone 210 provides a primary signal 212, to include the user's voice when the user speaks but which may also include components from additional acoustic signals. Each of the reference microphones 220 provides a reference signal 222 including substantially the same content as the primary signal 212, but with differing arrival times, phases, and/or amplitudes. In various examples, the reference signals 222 may be used as noise references to reduce or remove from the primary signal 212 content associated with the acoustic environment generally, e.g., while the user is not speaking, and therefore not associated with the user's voice.

Each of the reference signals 222 may be processed through an adaptive filter 232, whose outputs are combined by a combiner 234 to produce a noise estimate signal 224, which is subtracted from the primary signal 212 by a combiner 236, to produce a voice estimate signal 214, which may be provided as an output signal 240. The adaptive filters 232 may include adaptive algorithms that monitor the voice estimate signal 214 (e.g., shown as a feedback signal 216) and may adapt the respective adaptive filter 232, e.g., at various intervals. The adaptive filter 232 may cause the noise estimate signal 224 to improve at reducing content in the voice estimate signal 214, particularly when the user 120 is not speaking. Accordingly, when the user 120 is not speaking, the audio system 110 converges to provide a nearly null output signal 240, effectively reducing or nullifying the acoustic sources in the environment from providing representative components to the output signal 240. The adaptive filters 232, considered as a whole having their individual signals combined to be subtracted from the primary signal 212, may be deemed a multi-channel adaptive filter system.

The adaptive filters 232 may include adaptive algorithms that may be any number of adaptive algorithms known in the art, or other adaptive algorithms. In some examples, the adaptive algorithms may be any of a least mean square algorithm, a normalized least mean square algorithm, a recursive least mean square algorithm, or other algorithms, or may be a combination of any of these or other algorithms.

In various examples, the adaptive filters 232 may be configured to adapt during periods when the acoustic environment includes only noise sources (e.g., not including the user's voice or another desired signal) to determine appropriate filter responses (e.g., adapted weights, coefficients) to substantially reduce or remove noise content from the output signal 240, and to apply the adapted weights or coefficients (e.g., maintain them in operation in the filters 232) when a desired signal is present, e.g, when the user speaks. In various examples, a time period may provide a period of fixed or maintained filter weights or coefficients, or a signal detection, such as a voice activity detection (VAD), may trigger a freeze of adaptation to provide a period of fixed or maintained filter weights, or a combination of these or other approaches may be applied. For example, the adaptive filters 232 may take some time to adapt to a changed acoustic environment, such as the user beginning to speak, and such time may be sufficient to provide the user's voice content in the output signal. In other examples, additional or different time periods may be applied by selecting adaptation parameters, e.g., step size or adaptation constants, to produce relatively slow convergence and/or alternate adaptive algorithms, such as switching between multiple adaptive filters which adapt during disjoint time periods, for example. In some examples, detection of a desired signal may include voice activity detection, which may further include detecting a wake-up word, e.g., during a time period before the adaptive filters 232 adapt (and nullify) the changed acoustic environment (e.g., the user beginning to speak).

Some examples may include only a single reference microphone 220 to provide a single reference signal, which may be adaptively filtered by an adaptive filter 232, to provide substantial nullification to an acoustic environment. A change in the acoustic environment, such as a new desired signal, may provide components of the desired signal in an output signal, as previously discussed, even in such a single-channel (e.g., single reference microphone) example. In various examples, components of the desired signal may be included in the output signal while the adaptive filter(s) adapts or converges to the new acoustic environment (which may include a purposeful delay in convergence), and/or while the adaptive filter(s) is frozen by operation of background adaptation and/or signal activity detection or other mechanisms. In some examples, the controller 230 may operate on various microphone signals in sub-bands, such that each of the various components of the controller 230 shown in FIG. 3 may include a number of sub-components, each sub-component receiving and/or operating upon only a particular sub-band portion of the various signals described. For example, and with reference to FIG. 4, each microphone 210, 220 may provide a signal to an optional sub-band filter 410, which separates spectral components of each microphone into multiple sub-bands, and an optional sub-band synthesizer 420 may re-combine the multiple sub-bands into a suitable output signal 240. Accordingly, for a system having "n" sub-bands, each of the "m" adaptive filters 232 shown represents "n" adaptive filters, one for each sub-band. Various examples may separate microphone signals into 8, 16, 32, 64, 128 or more sub-bands. In certain examples, a system having four (4) reference microphone channels (m=4) processed across sixty-four (64) sub-bands (n=64) may include a total of 256 (e.g., 4×64) adaptive filters 232, one per sub-band per channel.

In some examples, signals from each microphone may be processed in analog form but preferably are converted to digital form by one or more ADC's, which may be associated with each microphone, or associated with the sub-band filter 410, or otherwise act on each microphone's output signal between the microphone and the sub-band filter 410, or elsewhere, e.g., as part of the controller 230. Accordingly, in certain examples the various components act upon digital signals derived from each of the microphones. Any of the ADC's, the sub-band filter 410, and other components of the example audio systems 110 described herein may be implemented, for example, by a digital signal processor (DSP) configured and/or programmed to perform the various functions of, or to act as, any of the components shown or discussed.

As discussed above, signals may be separated into sub-bands by the sub-band filter 410 when received and re-combined by the sub-band synthesizer 420 when provided at an output. Each of the various components shown may therefore logically represent multiple such components to process the multiple sub-bands. Further, the sub-band filter 410 may process the microphone signals to provide frequencies limited to a particular range, and within that range may provide multiple sub-bands that in combination encompass the full range. For example, the sub-band filter may provide sixty-four (64) sub-bands covering 125 Hz each across a frequency range of 0 to 8,000 Hz. An analog to digital sampling rate may be selected for the highest frequency of interest, for example a 16 kHz sampling rate, to satisfy the Nyquist-Shannon sampling theorem, for example, for a frequency range up to 8 kHz. Various examples may include a narrower or broader frequency range and may include more or fewer sub-bands, or may not include sub-band processing, in accord with varying application and operational requirements. Sub-band filtering, processing, and synthesis may be included in any of the examples described herein without regard for whether such is illustrated in any particular figure. In various examples, various overlap add (OLA) or weighted overlap add (WOLA) methods with varying configuration parameters (such as windowing, window size, overlap length, etc.) may be implemented for sub-band filtering and synthesis.

Figure 4:
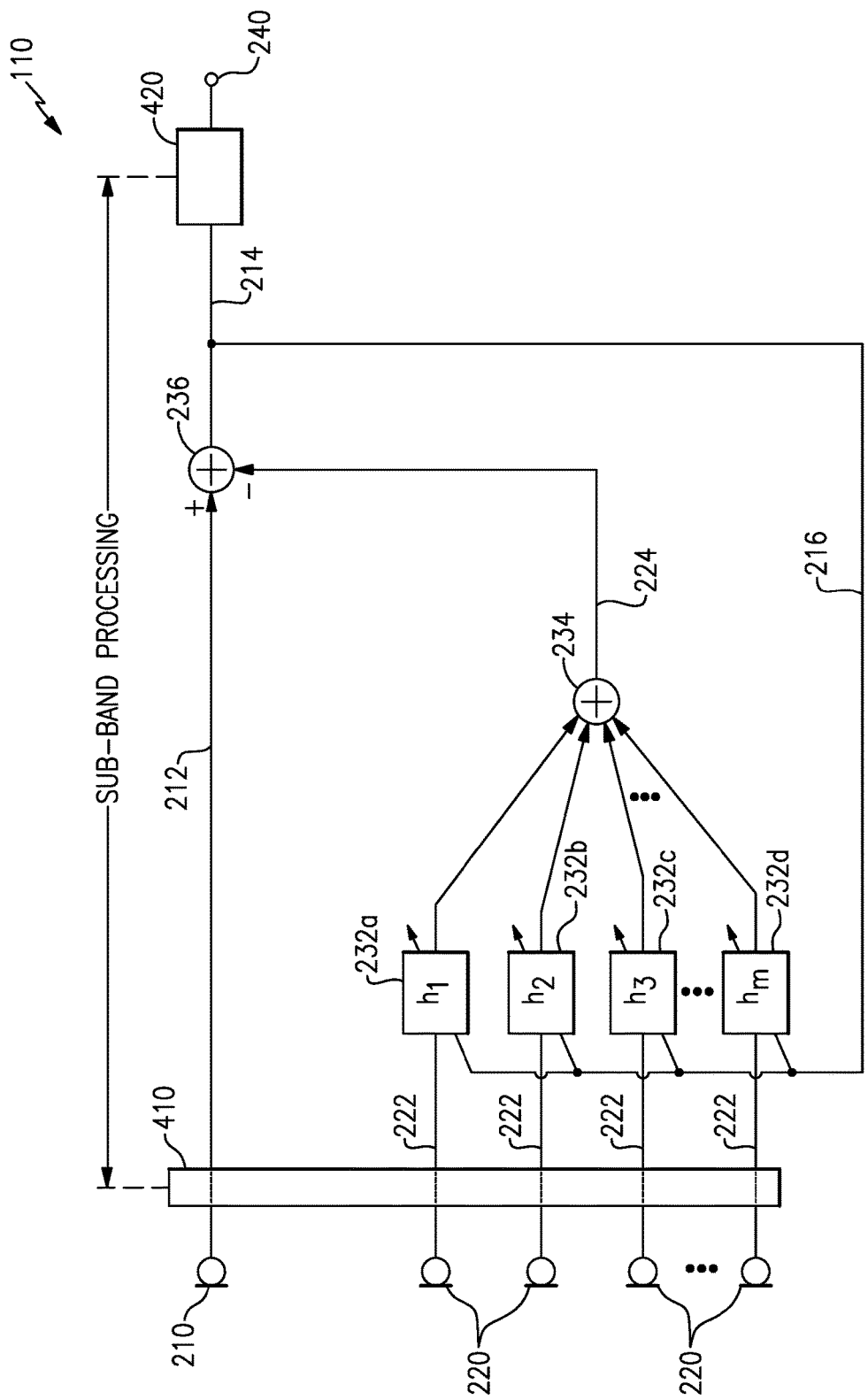
FIG. 4 is a schematic block diagram of an example audio system that includes an example of sub-band processing.

With continued reference to FIG. 4, the adaptive filters 232 may implement varying filter resolutions, or taps, across various examples to accommodate varying operational requirements in different environments. In various examples, the adaptive filters 232 may operate using 1 tap, 4 taps, 16 taps, 32 taps, or other resolutions. In some examples, a filter resolution may be selected in combination with a sub-band size, sampling rate, sampling bit depth, and/or other processing parameters to achieve various performance characteristic(s).

In various examples, a convergence time for the adaptive filters 232 may be sufficient for a command or instruction spoken by the user 120 to be provided in the output signal 240, prior to the adaptive filters 232 forming a new null (e g, minimizing an energy response at the output signal) that may reduce or cancel the user's speech. For example, some adaptive filters 232 may include a convergence time of around 1 second. In other examples, a convergence time of the adaptive filters may be purposefully lengthened or delayed. For example, each of the adaptive filters 232 (with reference to FIGS. 3-4) includes a filter that filters a respective signal from a reference microphone 220, and an adaptive algorithm that updates, or adapts, the filter, as discussed above. A slowed convergence of each of the adaptive filters 232 may, in some examples, provide additional time for a command or instruction spoken by the user 120 to be provided in the output signal 240. For example, each of the adaptive algorithms associated with a respective adaptive filter 232 may be tuned (e.g., by adjusting a step size or other adaptation constant, for instance) or adjusted to de-sensitize its response to changes in the acoustic environment, thus slowing its convergence rate, e.g., lengthening a time the adaptive filter 232 takes to adapt. Such a convergence delay may be selected or designed to provide a convergence time of 3 seconds, 5 seconds, 8 seconds, or more in various examples.

Figure 5:
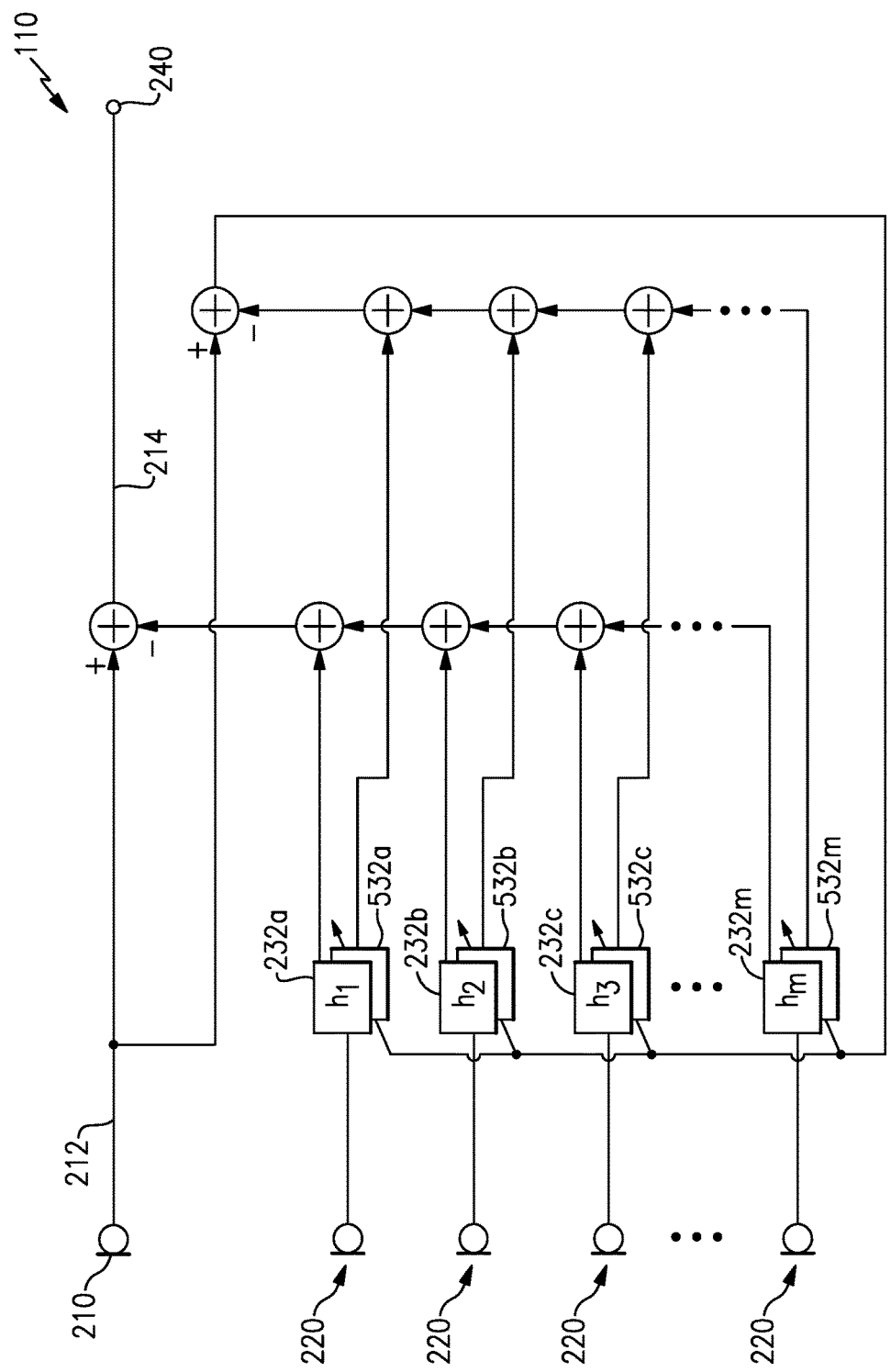
FIG. 5 is a schematic block diagram of an example audio system that includes an example of background adaptation.

In various examples, the adaptive filters 232 may include multiple adaptive filters per microphone 220 (e.g., per channel) (and in the case of sub-band processing, per sub-band) such that each (sub-band) channel includes an active filter and a background filter. The active and background adaptive filters may exchange functions, from active to background and vice-versa, at intervals, to create various intervals during which a desired signal, such as a user's voice, may not be adapted, reduced, nulled, or canceled by action of the adaptive filters 232. With reference to FIG. 5, a schematic diagram of an example system 110 that includes active and background adaptive filters is illustrated.

FIG. 5 shows an example audio system 110 in which signals from each reference microphone 220 may be processed by an active adaptive filter 232 and by a background adaptive filter 532. In some examples, the background adaptive filter(s) 532 may continuously adapt to minimize the response of an error signal 516, while the active adaptive filter(s) 232 maintain a fixed (or frozen) set of filter weights to provide a fixed response of an output signal 240, at least for a period of time. At various time intervals, such as a fixed interval of 3 seconds, 5 seconds, or 8 seconds or more in various examples, filter weights from the background adaptive filter 532 may be copied to the active adaptive filter 232. In some examples, the operation of the active and background adaptive filters 232, 532 may be swapped, such that the background adaptive filter 532 becomes active and frozen, and the active adaptive filter 232 begins to adapt its filter weights as a background adaptive filter.

In some examples, whenever the filter weights of an active adaptive filter are changed (e.g., copied from the background adaptive filter), the background adaptive filter may be re-set to begin adaptation from a newly non-adapted state. In other examples, the background adaptive filter may continue adaptation from the previously adapted filter weights without re-setting.

In some examples, the active adaptive filters 232 may be updated on the basis of criteria other than fixed intervals. For example, the active adaptive filters 232 may be updated by, e.g., copying weights from the background adaptive filters 532, whenever the background adaptive filters 532 have reached a particular level of convergence. In certain examples, the background adaptive filters 532 adapt from a re-set state and when the adaptation is sufficiently complete, e.g., by the filter weights not changing, or changing by less than a threshold and/or fractional amount, the filter weights may be copied over to the active adaptive filters 232. In some examples, the background adaptive filters 532 may be re-set after copying their weights to the active adaptive filters 232. In other examples, the background adaptive filters 532 may continue to adapt and may copy their weights to the active adaptive filters 232 at a later time, based upon, e.g., a threshold change to the weights and/or a threshold convergence after such a change to the weights. Accordingly, the active adaptive filters 232 may operate with relatively fixed filter weights for various intervals, the various intervals may be fixed intervals by design or may be intervals based upon various criterion of the background adaptive filters 532, such as a convergence criteria of the background adaptive filters 532 and/or a threshold change having occurred in the weights of the background adaptive filters 532. In each of these example cases, a fixed response of the system may be sufficiently long (e.g., in time) for a desired signal to be provided and/or detected in the output signal 240.

In various examples, the various adaptive filters may be frozen upon detection of the desired signal, such as when the user is speaking, and accordingly may allow the desired signal to be provided in the output signal 240 for a period of time following such detection. For example, a voice activity detector may monitor the estimated voice signal 214 and send a signal to the adaptive filters 232 to pause adaptation upon detecting voice activity in the voice estimate signal. In certain examples, a wake-up word may be short enough in duration, relative to a convergence time of the adaptive filters 232, to be detected in the output signal 240 and signal the adaptive filters 232 to pause adaptation. Accordingly, in some examples, a voice activity detector may be a wake-up word detector.

Figure 6:
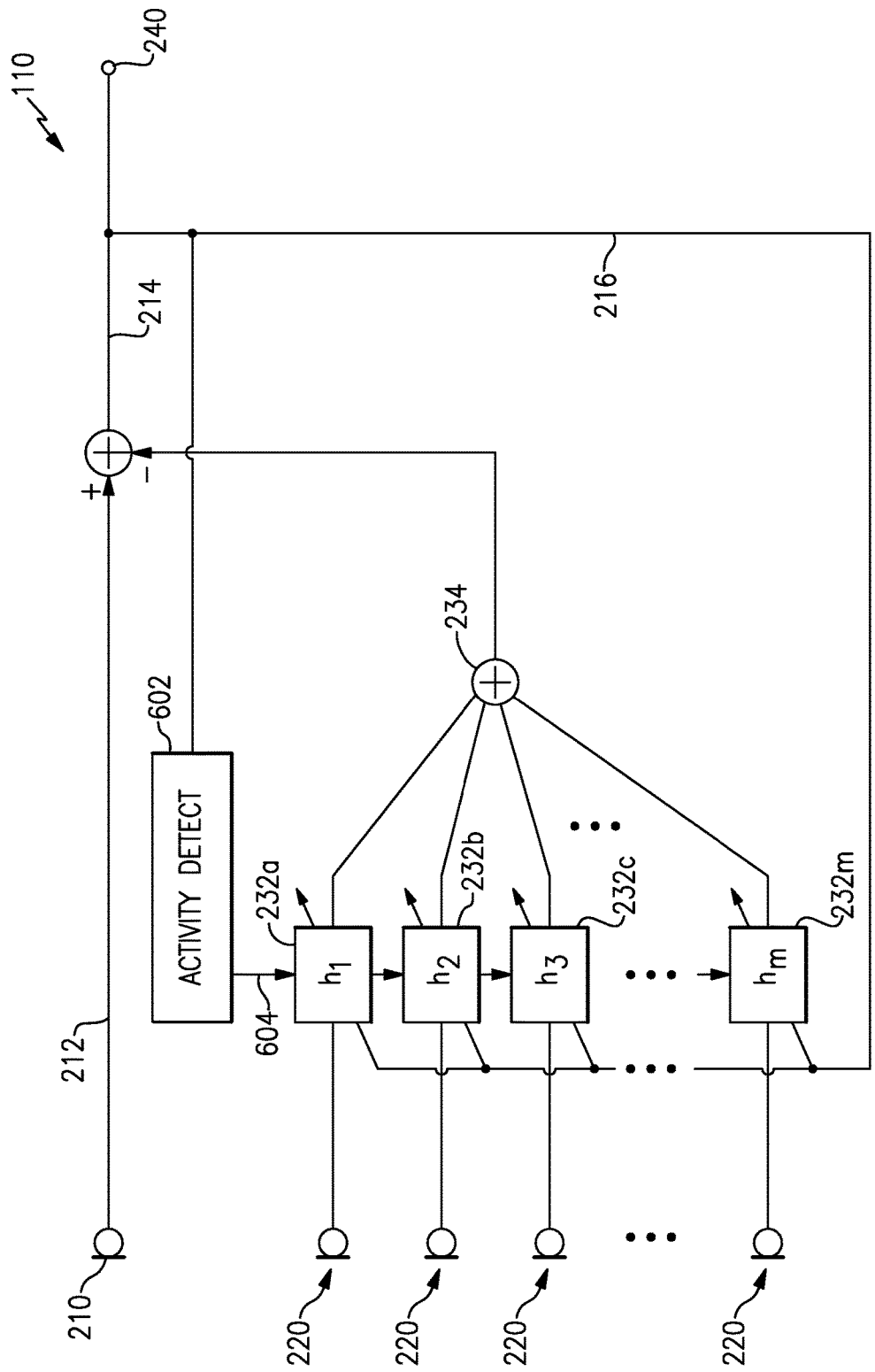
FIG. 6 is a schematic block diagram of an example audio system that includes an example of activity detection.

With reference to FIG. 6, an example audio system 110 that includes signal activity detection is illustrated. The adaptive filters 232 may be controlled to pause adaptation while continuing to filter signals based upon the most recent filter weights or coefficients. The activity detector 602 may control when the adaptive algorithms (associated with the adaptive filters 232) are paused. For example, the activity detector 602 may monitor the output signal 240 for an indication of a desired signal, such as a particular spectral content, or the presence of a wake-up word, or other criteria, and upon detecting the desired signal activity the activity detector 602 may send a signal 604 to each of the adaptive filters 232 to pause (or freeze) adaptation of its respective filter weights or coefficients. In some examples, each of the adaptive filters 232 may be configured to use filter weights or coefficients that were calculated just prior to the desired signal being detected. In various examples, the activity detector 602 may generate the signal 604 to pause adaptation for a certain period of time, such as 3 seconds, 5 seconds, 8 seconds, or more. In other examples, the activity detector 602 may generate the signal 604 only while the desired signal continues to be detected. In other examples, the adaptive algorithms may be configured to pause adaptation for the certain period of time upon receiving the signal 604, or a period of time may be enforced in other ways.

In various examples, an activity detector, such as the activity detector 602, may monitor other aspects of the audio system 110 in addition to or instead of monitoring the output signal 240. For example, an activity detector 602 may calculate a correlation between the primary signal 212 and the noise estimate signal 224 and may monitor the correlation for changes. A change in the acoustic environment may cause the correlation between the primary signal 212 and the noise estimate signal 224 to change, thus the activity detector 602 may incorporate such a change in correlation into a decision whether a desired signal is present. Additionally, once converged, the weights applied by, e.g., the adaptive filters 232 may remain substantially constant so long as the acoustic environment remains unchanged. A change in the acoustic environment, such as the presence of a desired signal, e.g., a user speaking, causes the adaptive filters 232 to begin to adjust the weights applied. Accordingly, a new or significant change to the weights of the adaptive filters 232 may indicate a change in acoustic environment, which may be related to a desired signal. The activity detector 602 may incorporate such into a decision whether a desired signal is present, and if so, pause further adaptation and/or revert to filter weights in use just before the change occurred.

In various examples, any of the elements particularly described above with reference to FIGS. 3-6 may be combined for advantageous effect. For example, delayed adaptation may provide a slowed convergence time in which a desired signal (e.g., voice activity, a wake-up word) may be detected, as illustrated in FIG. 6, to trigger a pause in adaptation. Further, active and background adaptive filters as illustrated in FIG. 5 may be paused by a signal from an activity detector as illustrated in FIG. 6. Further as described above, sub-band filtering, processing, and synthesis may be incorporated into any one or combinations of aspects illustrated by FIGS. 3-6. Additionally, alternate systems and methods of providing a primary signal may be combined with any of the aspects of sub-band filtering, processing, synthesis, convergence times, background adaptation, and activity detection. At least one example of alternately providing a primary signal is described with reference to FIG. 7.

Figure 7:
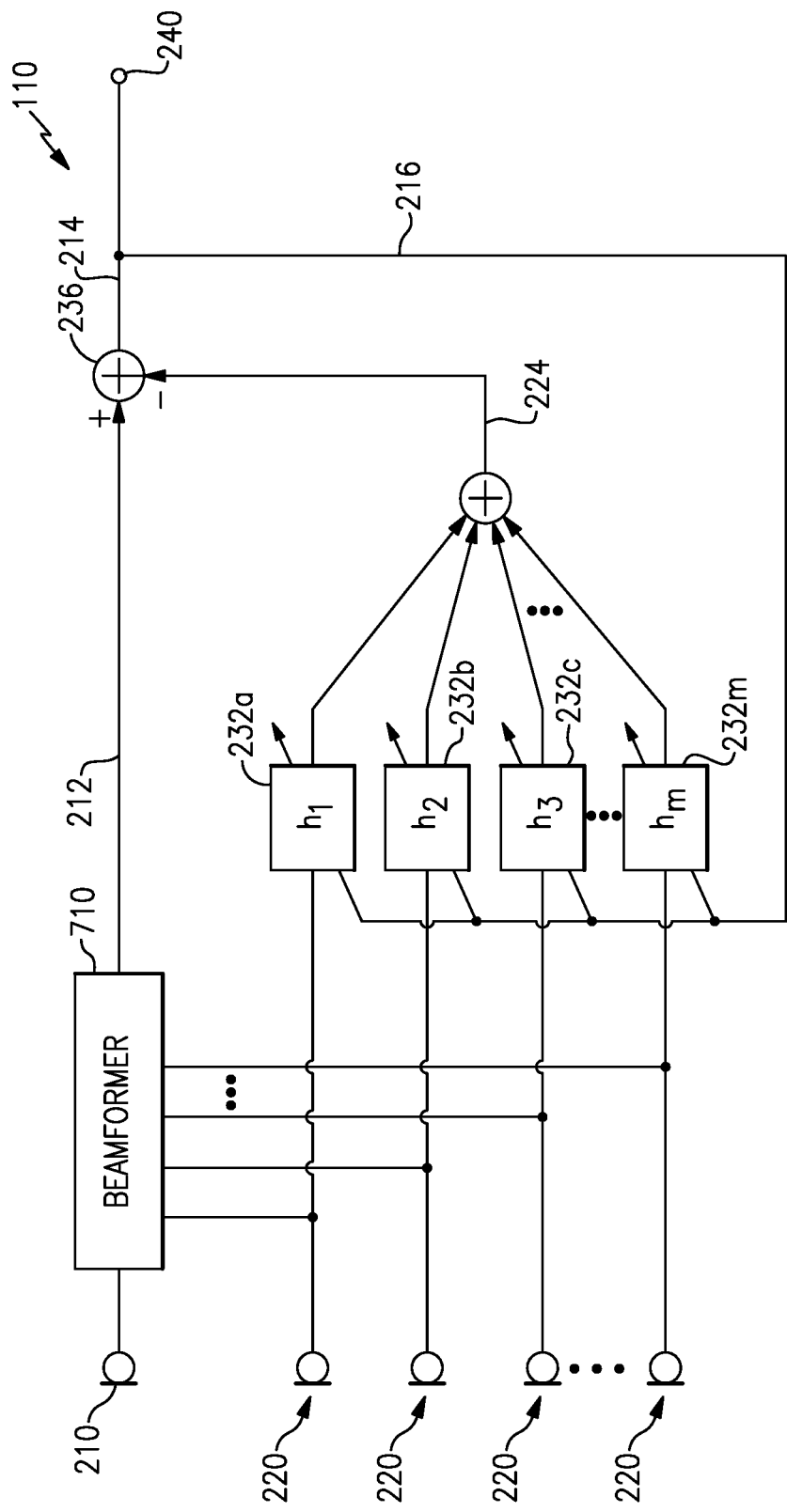
FIG. 7 is a schematic block diagram of an example audio system that includes an example of beamforming to provide a primary signal.

FIG. 7 illustrates an alternate example audio system 110 wherein the primary signal 212 is provided by action of a beamformer 710. Any of the microphones 210, 220 may provide signals to the beamformer 710 that may apply array processing to steer a beam (e.g., a direction of enhanced acoustic response) toward an expected location, e.g., of the user 120. In some examples, multiple sets of beamforming weights (e.g., one set for each of various directions) may be pre-configured (e.g., stored in memory), and a selected set of the beamforming weights may be applied by the beamformer 710. Operation of the adaptive filters 232 may be independent of the method or system applied to provide the primary signal 212, and therefore any of the above described operations of the adaptive filters 232, sub-band processing, convergence times, active and background adaptation, and activity detection, with reference to FIGS. 3-7, may be advantageously applied to the example audio system 110 of FIG. 7. Indeed, the example audio system 110 illustrated in FIG. 7 may be a general case of the example audio system 110 illustrated in FIG. 3, e.g., a beamformer 710 in FIG. 7 that selects and provides a signal from the primary microphone 210 and rejects signals from the reference microphones 220 reduces to the specific case illustrated in FIG. 3.

Various examples of systems and methods in accord with those described herein may include detection of various characteristics of the noise field of the acoustic environment. For example, adaptive systems and methods as described herein may exhibit more robust performance in an acoustic environment having dominant discrete acoustic noise sources and exhibiting high levels of coherence between the various microphones. Systems and methods described herein operating in a more diffuse acoustic field may operate more robustly by including beamforming techniques such as those described with reference to FIG. 7.

Accordingly, some examples detect whether a noise field of the acoustic environment exhibits more discrete characteristics or more diffuse characteristics, and may select various operating parameters based in part upon the noise field detection. For example, use and operation of beamforming to provide a primary signal, aggressiveness of adaptive filters (e.g., convergence times), and/or whether to pause or freeze adaptation for a period of time, may be based upon detection of noise field characteristics, in some examples. For instance, some examples may use beamforming to provide the primary signal and less aggressive adaptation when the noise field is detected to be more diffuse, and may use an omni-directional microphone to provide the primary signal and more aggressive adaptation when the noise field is detected to be more discrete. Determination of the diffusivity of the noise field may be determined, in some examples, by calculating or determining a magnitude-squared coherence between various microphone channels. In some examples, a magnitude-squared coherence is determined for frequencies expected to have a low coherence for diffuse noise fields, e.g., nulls in a characteristic sinc function.

Various examples of systems and methods in accord with those described herein may include one or more acoustic drivers for the production of acoustic signals from one or more program content signals. For example, an audio system may include one or more loudspeakers in addition to multiple microphones, such as the microphones 210, 220 of any of the above described example audio systems, or combinations or alternatives thereof, and may receive a program content signal for playback as an acoustic signal. Such an audio system may be a speakerphone system, a portable speaker, a virtual assistant device, a soundbar, etc. and may be coupled via a wireless connection, e.g., Bluetooth™ or wi-fi, or a wired connection, e.g., optical, coaxial, Ethernet, using any of various protocols and/or signal formats, to audio signal sources, such as a smartphone, a television, a remote server, or the like. The loudspeaker(s) of the example audio system described may be an alternate audio source providing acoustic signals that are not desired to be part of an output signal, e.g., the output signal 240. In some examples, operation of the adaptive filters 232 upon signals from the reference microphones 220 may sufficiently reduce audio program content (e.g., from the program content signal(s) being converted to one or more acoustic signals by one or more loudspeakers) from the primary signal 212 to provide a sufficient output signal 240. In other examples, an echo cancelation subsystem may be included that removes some or all of the rendered program content from the primary signal 212 or from one or more of the reference signals 222 to substantially remove or reduce components of the program content signal from being present in the output signal 240.

Various examples of the systems and methods in accord with those described herein may include variations to operation, components, and features based upon application or environment. For example, an audio system designed for portable use may include an option to operate from battery power at times, and the number of reference microphones (e.g., adaptive channels), adaptive filters, sub-bands, sampling frequency, and the like, may be selected or may be adapted to reduce power consumption in certain examples. In some examples, tradeoffs to reduce power consumption may be made on the fly by the system, and may include trading off performance in terms of noise reduction for an extended operating time (e.g., battery life). Such options may be configurable by the user in certain examples. Additionally, such options may be changed over time, e.g., as a battery charge level reduces below one or more thresholds, for example. An audio system expected to be used in a more fixed environment, such as a home or office speaker that may be plugged in and may be expected to remain in a fixed position for an extended period of time, may be designed for more robust operation at the expense of increased power consumption, for instance, at least in part due to the expected reliability and sufficiency of power from, e.g., an electric grid. In such cases, the system may use more reference microphones (e.g., more channels), more adaptive filters (perhaps with higher resolution), higher sampling frequency, more sub-bands, etc., to provide more robust performance without concern for power consumption. Some examples may incorporate expected knowledge regarding the acoustic environment. For example, a portable system may be expected to perform in a more widely varying and/or changing acoustic environment while a non-portable (though moveable) system may be expected to operate among a more limited set of conditions that may not change much over time. Accordingly, a non-portable system may maintain or store adapted filter weights, e.g., when powered off, to use again at the next power-on event. A portable system may not benefit from storing previously converged filter weights because there may be no expectation that it will be turned on in the same acoustic environment as it was previously operated. A portable sytem operating on battery power may be more likely to be outside, with few reflected or reverberant signals, whereas a non-portable system may be expected to be inside, with walls nearby, having relatively strong noise signals from multiple directions. Accordingly, in various examples, various configurations including operational parameters, power consumption, processing resources, memory, etc. may be selected or chosen based upon one or more expected use scenarios and/or expected acoustic environments.

One or more of the above described systems and methods, in various examples and combinations, may be used to capture the voice of a user and isolate or enhance the user's voice relative to additional acoustic sources and background noise. Any of the systems and methods described, and variations thereof, may be implemented with varying levels of reliability based on, e.g., microphone quality, microphone placement, acoustic ports, structural or device frame design, threshold values, selection of adaptive, spectral, and other algorithms, weighting factors, window sizes, filter resolutions, sub-band frequency widths, etc., as well as other criteria that may accommodate varying applications and operational parameters.

It should be understood that many of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), micro-controller(s), and the like, or any combination of these, may be suitable, and may include analog or digital circuit components and/or other components with respect to any particular implementation Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, microphone, driver, or loudspeaker, may be any of many types of transducers known in the art. For example, an acoustic structure coupled to a coil positioned in a magnetic field, to cause electrical signals in response to motion, or to cause motion in response to electrical signals, may be a suitable acoustic transducer. Additionally, a piezoelectric material may respond in manners to convert acoustical signals to electrical signals, and the reverse, and may be a suitable acoustic transducer. Further, micro-electrical mechanical systems (MEMS) may be employed as, or be a component for, a suitable acoustic transducer. Any of these or other forms of acoustic transducers may be suitable and included in various examples.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of enhancing an audio signal, the method comprising:
receiving a primary signal;
receiving a plurality of reference signals, each of the plurality of reference signals from one of a plurality of reference microphones;
adaptively filtering each of the plurality of reference signals to provide a plurality of filtered signals;
combining the plurality of filtered signals to provide a noise estimate signal;
subtracting the noise estimate signal from the primary signal to provide an output signal; and
adapting the adaptive filtering of each of the plurality of reference signals to minimize an energy content of the output signal, such that a desired signal produced by a new acoustic source is adapted by the adaptive filters, over time, to be included in the noise estimate signal, the noise estimate signal thereby causing the output signal to provide a substantially null response in an acoustic environment having substantially constant acoustic sources.

2. The method of claim 1 further comprising monitoring the output signal for the desired signal, and stopping adapting the filtering of each of the plurality of reference signals upon detecting the desired signal.

3. The method of claim 2 wherein monitoring the output signal for the desired signal includes monitoring the output signal for a wake-up word.

4. The method of claim 1 further comprising providing the primary signal from a primary microphone.

5. The method of claim 1 further comprising combining a plurality of signals from a plurality of microphones to provide the primary signal.

6. The method of claim 1 further comprising separating each of the primary signal and the plurality of reference signals into sub-bands.

7. The method of claim 1 further comprising operating a background adaptive filter upon each of the plurality of reference signals, and wherein adapting the filtering of each of the plurality of reference signals includes copying a set of filter weights from the background adaptive filter.

8. The method of claim 1 further comprising providing, responsive to the new acoustic source in the acoustic environment, signal components from the new acoustic source, at least on a temporary basis, in the output signal.

9. An audio system, comprising:
a primary input to receive a primary signal;
a plurality of reference inputs, each of the plurality of reference inputs to receive a reference signal;
a plurality of adaptive filters, each of the plurality of adaptive filters configured to adaptively filter one of the plurality of reference signals to provide a filtered signal; and
one or more combiners configured to receive the plurality of filtered signals and subtract the plurality of filtered signals from the primary signal to provide an output signal,
each of the plurality of adaptive filters configured to adapt to provide its respective filtered signal to cause the output signal to provide a substantially null response in an acoustic environment having substantially constant acoustic sources and to adapt to a desired signal produced by a new acoustic source, over time, to include the desired signal in the plurality of filtered signals such that the desired signal is also subtracted from the primary signal.

10. The audio system of claim 9 further comprising a detector configured to detect a component of the desired signal in the output signal and to pause adaptation of the plurality of adaptive filters in response to detecting the component of the desired signal.

11. The audio system of claim 10 wherein the detector is a wake-up word detector.

12. The audio system of claim 9 further comprising a plurality of microphones, at least one of the plurality of microphones configured to provide at least one of the reference signals to at least one of the plurality of reference inputs.

13. The audio system of claim 12 further comprising a beamformer configured to receive signals from one or more of the plurality of microphones and to provide the primary signal to the primary input.

14. The audio system of claim 9 wherein the plurality of adaptive filters are configured to adapt to minimize an energy content of the output signal.

15. The audio system of claim 9 wherein each of the plurality of adaptive filters includes an active filter and a respective background adaptive filter, each active filter being configured to adapt by copying filter weights from the respective background adaptive filter.

16. An audio system, comprising:
a primary microphone to provide a primary signal;
a reference microphone to provide a reference signal;
a filter configured to receive the reference signal and provide a filtered signal, the filter configured to apply a fixed filter response for a fixed duration interval and to update the fixed filter response upon the expiration of the interval;
a combiner to subtract the filtered signal from the primary signal to provide an output signal,
the fixed filter response selected to cause the output signal to provide a substantially null response in an acoustic environment having substantially constant acoustic sources and, responsive to a new acoustic source in the acoustic environment, to provide signal components from the new acoustic source in the output signal, and the updated filter response selected to cause the output signal to provide a substantially null response to the acoustic environment including the new acoustic source; and
a detector configured to detect a desired signal in the output signal.

17. The audio system of claim 16 further comprising a background adaptive filter operating on the reference signal and the interval being based upon a convergence time of the background adaptive filter, the expiration of the interval being a time when the background adaptive filter achieves convergence, and the update to the fixed filter response being based upon a filter response of the background adaptive filter at the expiration of the interval.

18. The audio system of claim 16 wherein the desired signal is representative of a wake-up word, and the fixed duration interval being based upon the detection of the desired signal.

19. The audio system of claim 16 further comprising a second reference microphone to provide a second reference signal, and a second filter configured to receive the second reference signal and provide a second filtered signal, the second filter configured to apply a second fixed filter response for the interval and to update the second fixed filter response upon the expiration of the interval, the combiner configured to subtract the filtered signal and the second filtered signal from the primary signal to provide the output signal.

20. The audio system of claim 16 further comprising a beamformer configured to receive one or more microphone signals, including microphone signal from the primary microphone, and to provide the primary signal as a combination of the one or more microphone signals.

* * * * *